Patented Oct. 7, 1952

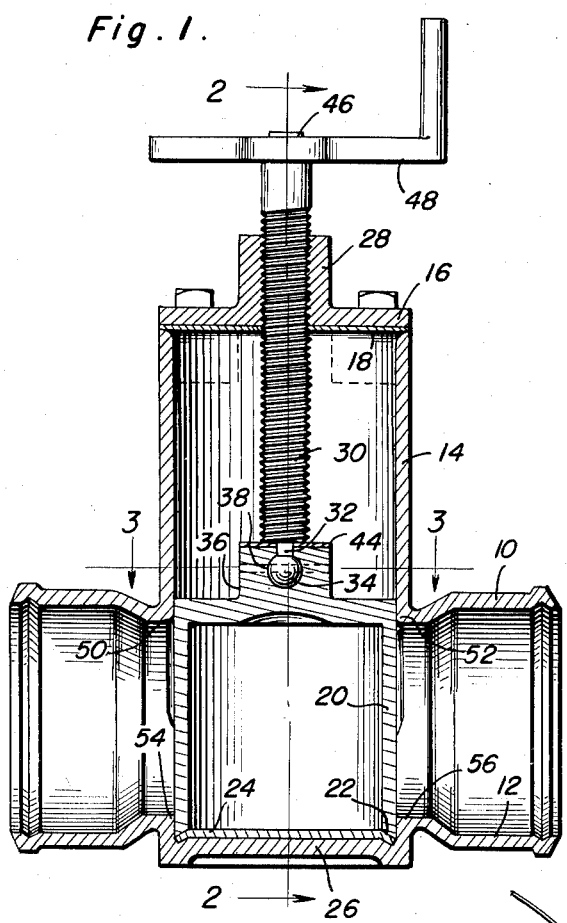
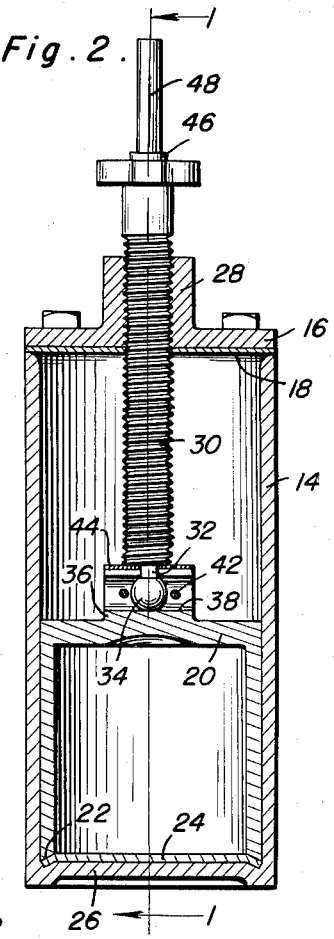
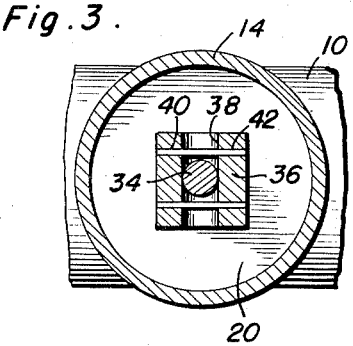
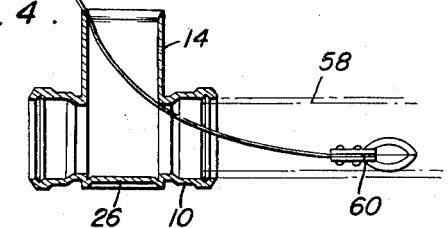
Tony Slapnicher
INVENTOR.

2,613,055

UNITED STATES PATENT OFFICE 2,613,055

MANUALLY OPERATED BACKWATER SEWER VALVE

Tony Slapnicher, Hibbing, Minn.

Application July 14, 1948, Serial No. 38,607

1 Claim. (Cl. 251—63)

This invention relates to new and useful improvements in valves and the primary object of the present invention is to provide a novel and improved manually operated back water sewer valve that is so designed as to prevent clogging or restriction in the sewer pipes to which the same is applied.

Another important object of the present invention is to provide a valve including a body having an axial passage, a valve chamber communicating with the passage, and a novel and improved slidable valve movable through the chamber to effectively and efficiently seal the passage and which is actuated to completely open the passage without restricting the flow of fluid through the passage.

A further object of the present invention is to provide a manually operated and regulated valve including a valve chamber having a removable closure thus permitting a scraper or cleaner to be extended through the chamber and into a pipe line to clean or scrape the latter.

A still further aim of the present invention is to provide a valve of the aforementioned character that is simple and practical in construction, strong and reliable in use, small and compact in structure, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a longitudinal vertical sectional view taken substantially on the plane of section line 1—1 of Figure 2;

Figure 2 is a longitudinal vertical sectional view taken substantially on the plane of section line 2—2 of Figure 1;

Figure 3 is a transverse horizontal sectional view taken substantially on the plane of section line 3—3 of Figure 1; and, Figure 4 is a diagrammatic view showing the manner in which a scraper is applied through the chamber portion of the present invention.

Referring now to the drawings in detail, wherein for the purpose of illustration, there is disclosed a preferred embodiment of the present invention, the numeral 10 represents a body having an axial passage 12 extending longitudinally therethrough.

Integrally formed with and projecting laterally from the body 10 intermediate the ends thereof, is a cylindrical sleeve or chamber 14 having its outer open end closed by a removable closure or plate 16 the inner face of which supports a gasket 18 that seals the closure to the outer end of the chamber.

Slidably engaging the compartment 14, is a cylindrical valve 20 having an open lower end the edge of which is beveled as at 22 to engage and bite into a soft metallic lining 24 that is secured in an annular valve seat 26 provided in the wall of the passage 12 opposite from the chamber 14.

An internally threaded sleeve 28 is integrally formed with the plate 16 and registers with a central opening provided in the plate 16 to receivably engage an externally threaded operating rod 30 having a reduced inner end 32 that terminates in a spherical element 34.

A lug 36 integrally formed with the upper closed end of the valve 20 and is provided with a channeled groove 38 that engages the spherical element 34.

A pair of spaced parallel transverse bores 40 are provided in the lug 36, intersect at right angles the groove 38 and receive pins, wire rods or the like 42 that will retain the stem or rod 30 relative to the piston or valve 20 when the same are removed from the chamber 14. A gasket 44 carried by the portion 32 engages and is preferably fixed to the lug 36 to retain the element 34 relative to the lug 36.

The upper end of the rod 30 terminates in a substantially square extremity 46 that engages a wrench 48 for rotating the rod 30 to actuate the valve 20.

The inner wall of the body 10 is provided with arcuate semi-circular rounded edges 50 and 52 the lower semi-circular portions 54 and 56 of which are straight to seal the lower end of the valve 20 when the same is disposed in a closed position.

In practical use of the present invention, the annular beveled edge 22 of the valve 20, when raised partially or completely, will tend to cut and prevent any material from clogging in the body 10 and the straight edge 54 and 56 of the body 10 will also prevent material from clogging in the body 10.

When it is necessary to clean or scrape the inner walls of pipes 58 that extend from the body 10, the closure 16 is removed from the chamber 14, the valve 20 and rod 30 are removed from the chamber 14, and a scraper 60 and a flexible line 62 are quickly and readily extended through the chamber 14 and body 10 into the pipe 58.

The rounded edges 50 and 52 will prevent breakage or stripping of the flexible element 62.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A manually operated back sewer valve comprising an elongated body having a longitudinal passage extending therethrough, a chamber fixed to and projecting outwardly from the body intermediate the ends of the body and intersecting the passage, said chamber having a removable closure at its end remote from the passage, a valve seat located with the wall of the passage spaced from and in registry with the other end of said chamber, a soft metallic lining in said seat and having a beveled peripheral edge, a hollow cylindrical valve slidably received in said chamber and having a beveled peripheral edge facing said lining and complemental to the beveled edge of said lining for engaging said beveled edge of said lining as the valve is moved to its closed position in the passage, an operating rod extending axially through the chamber and having an end threaded through said closure, the other end of said rod being reduced, a spherical element at the reduced end of said rod, a lug integrally formed with the end of said valve remote from the beveled edge of said valve and having a channeled groove receiving said spherical element, a gasket fixed to said lug and overlying said groove, said gasket having an aperture receiving the reduced end of said rod and retaining the spherical element in said groove, said lug having a pair of spaced parallel horizontal bores intersecting said groove at right angles, and pins fitted in said bores and confining the spherical element therebetween.

TONY SLAPNICHER.

REFERENCES CITED

The following references are of record in the file of this patent:

UNITED STATES PATENTS

| Number | Name | Date |
|---|---|---|
| Re. 6,922 | Chapman | Feb. 15, 1876 |
| 1,088,616 | Palmer | Feb. 24, 1914 |
| 1,283,907 | Rigby | Nov. 5, 1918 |
| 1,301,278 | Labus | Apr. 22, 1919 |
| 1,506,546 | Oleson | Aug. 26, 1925 |
| 1,638,162 | Kirschbraun | Aug. 9, 1927 |
| 2,000,853 | Lange | May 7, 1935 |
| 2,359,442 | Sandlands | Oct. 3, 1944 |

FOREIGN PATENTS

| Number | Country | Date |
|---|---|---|
| 49,265 | Norway | Apr. 20, 1931 |